Feb. 7, 1950    A. J. E. BEHM ET AL    2,496,847
WIRE WINDING MACHINE PARTICULARLY
FOR ELECTRIC HEATING ELEMENTS
Filed March 25, 1947      4 Sheets-Sheet 3
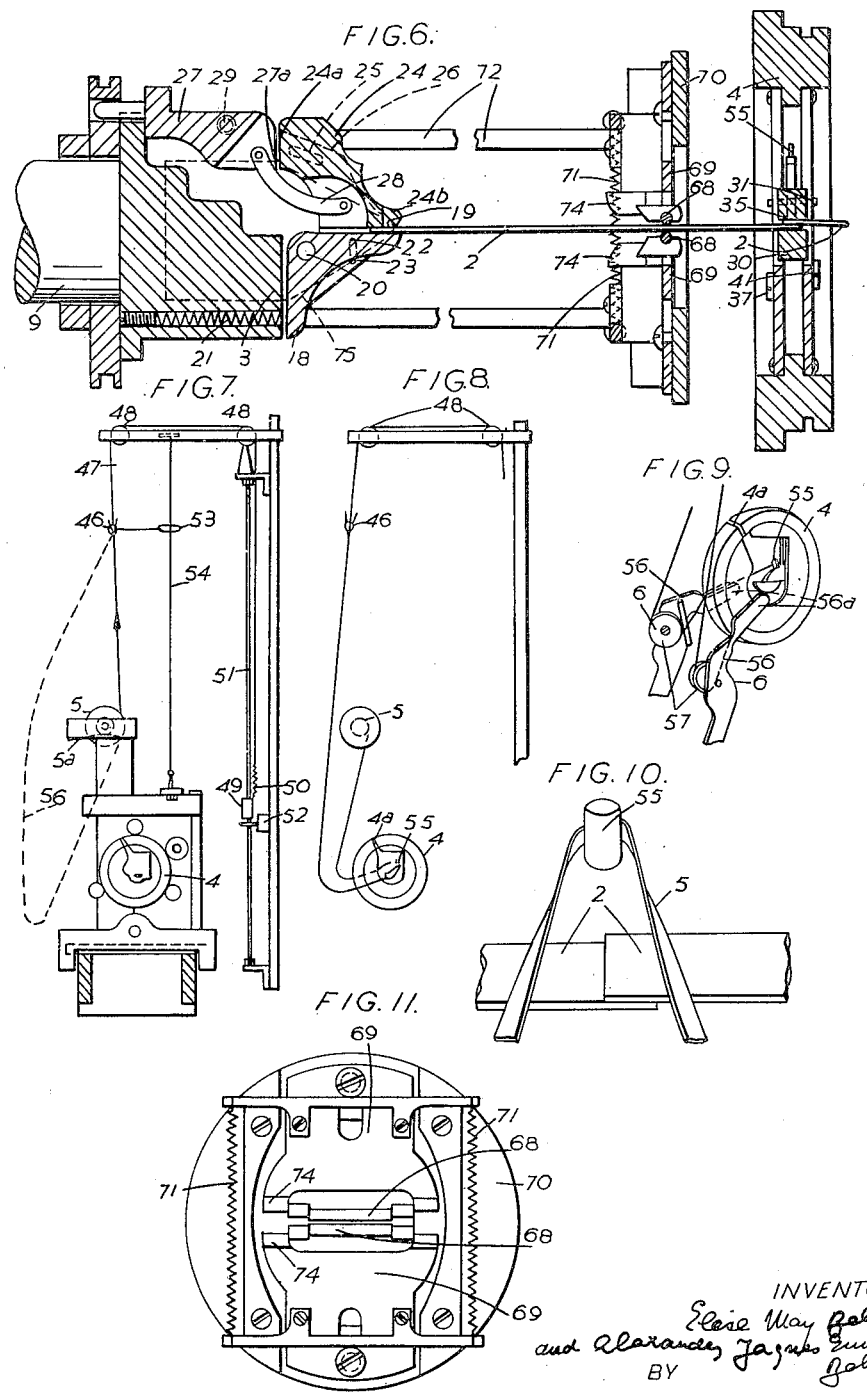

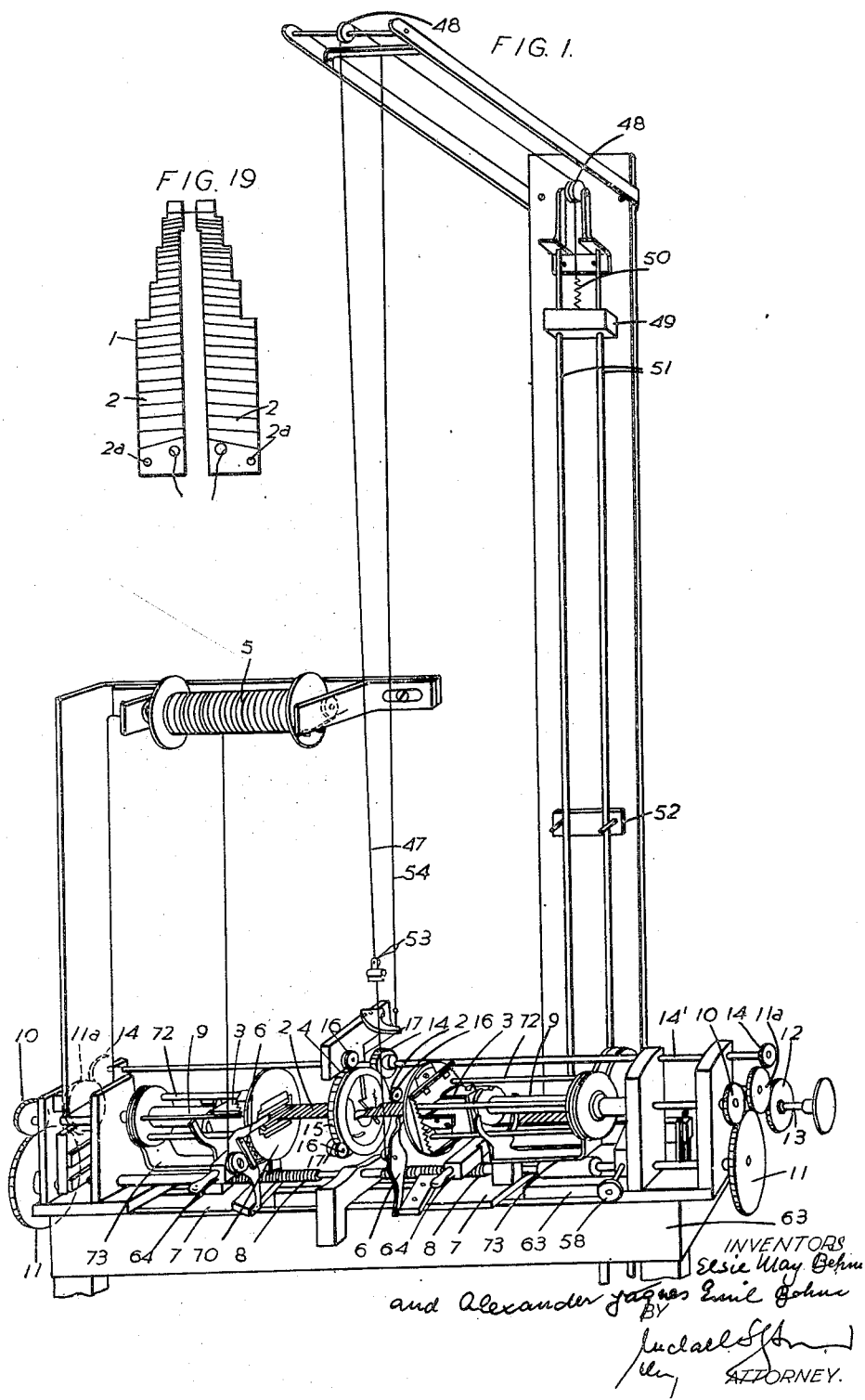

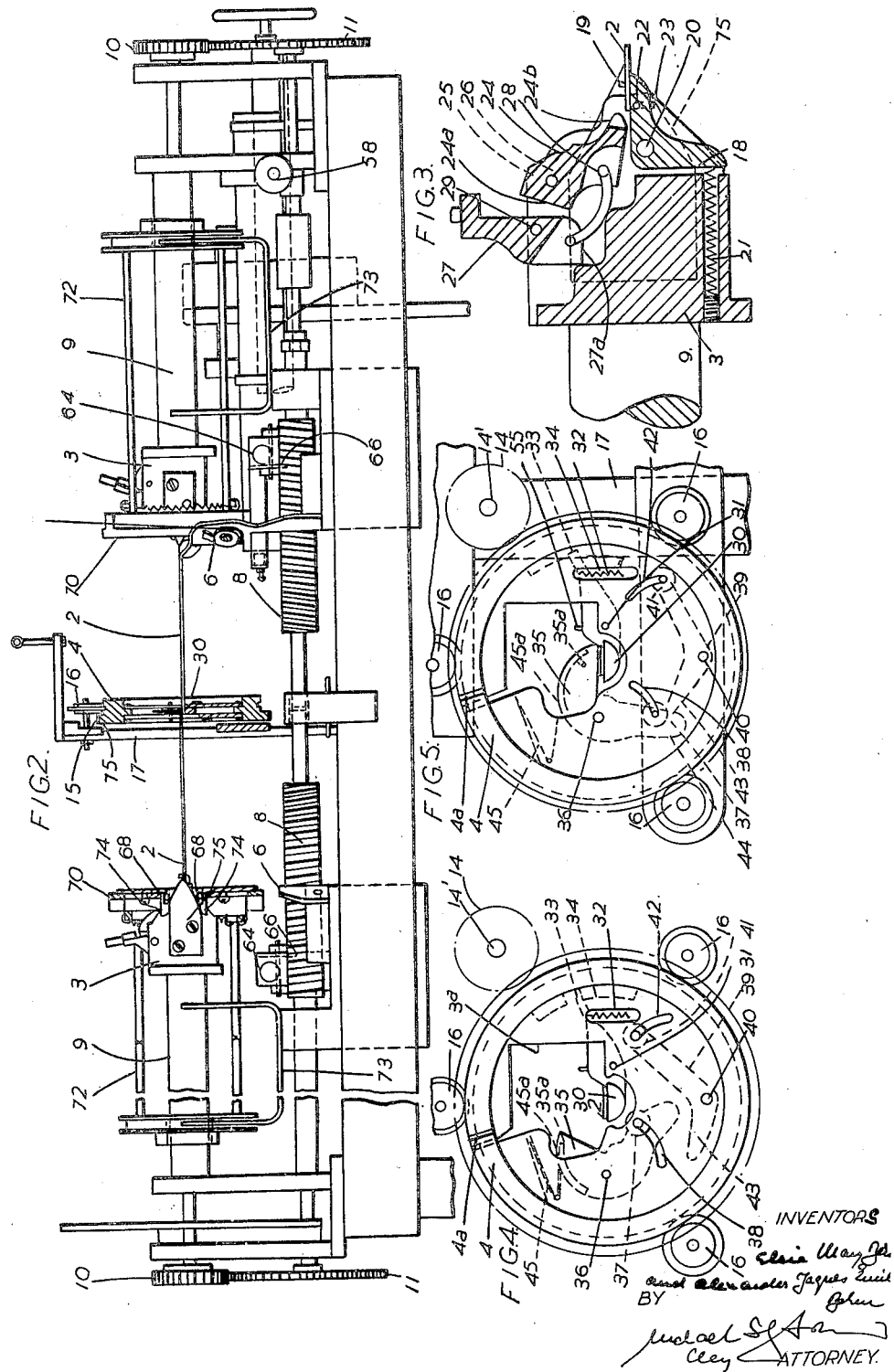

Feb. 7, 1950   A. J. E. BEHM ET AL   2,496,847
WIRE WINDING MACHINE PARTICULARLY
FOR ELECTRIC HEATING ELEMENTS
Filed March 25, 1947   4 Sheets-Sheet 4

INVENTORS
Elsie May Behm
and Alexander Jaques Emil Behm
BY
ATTORNEY.

Patented Feb. 7, 1950

2,496,847

UNITED STATES PATENT OFFICE 2,496,847

WIRE WINDING MACHINE, PARTICULARLY FOR ELECTRIC HEATING ELEMENTS

Alexander Jaques Emil Behm and Elsie May Behm, Nottingham, England

Application March 25, 1947, Serial No. 737,070
In Great Britain October 22, 1946

11 Claims. (Cl. 242—1)

This invention is for improvements in or relating to wire winding machines particularly machines for winding electric heating elements. Some heating elements consist of a single former wound from end to end by a single length of resistance wire and such formers are readily wound by a machine. Other elements however, consist of more than one former e. g. the element in an electric iron consists of a pair of substantially parallelly spaced formers each wound individually by a single continuous length of flat sectioned wire which at one end extends from one former to the other. Heretofore, such elements consisting of more than one former have not been wound automatically on a machine. The main reason for this is that if the formers are positioned end to end in a machine and a single continuous length of flat-resistance wire is wound from one end to the other of the two formers and then the formers are removed from the machine and turned into the desired parallel attitude, the wire adjoining the two formers becomes kinked and the composite article is thus rendered unsuitable for commercial use for reasons which will be obvious to all skilled in the art; therefore such formers have been invariably wound by hand in such manner that kinking of the wire is avoided.

In heating elements of the type described the formers are often irregular in shape to suit the particular purpose for which the elements are employed (for example, a former may be wider at one end than the other), and the pitch of the wire on such formers is desirably varied in a predetermined manner to suit the particular shape of the formers (e. g. the pitch of the wire may be one of constant size over a predetermined length of the former but of a different constant size over the remainder of the former).

The winding of wire on heating elements wherein the pitch of the wire is intended to be constant is in itself a difficult and tedious task having regard to the fact that it is desirable for the coils to be evenly and equally spaced apart and when, in addition, the pitch of the wire is intended to be different for one part of a former than for another part the task is rendered even more difficult and tedious; and the training of operatives to carry out the work satisfactorily is a comparatively long process.

An object of the invention is to avoid the necessity for hand winding heating elements by providing a machine for such purpose which avoids the formation of kinks in the element; thus saving time and labour and minimising the amount of training required by operatives.

With this and other objects in view the invention resides in providing a machine for winding a filament onto two formers simultaneously, with releasable means for maintaining the formers end to end, and with means for rotating the formers received in the said releasable means about a common axis, guides for guiding the ends of a single length of filament onto each former, and means for simultaneously traversing said guides in opposite directions lengthwise of the formers. A further feature of this invention resides in the provision of a rotatable center chuck mounted on supports near its periphery and with means for positively rotating said chuck.

The invention further provides means for securing a bight in the filament to the said rotatable chuck. A throat is provided leading inwards from the periphery of the chuck to the center for the passage of the filament; means are also provided for varying the pitch of the filament wound onto one or more formers comprising at least one variable pitch head screw. Another feature of the invention is the provision of means for controlling a filament to be wound onto one or more formers including a measuring device for drawing off a predetermined length of filament from a supply after each winding operation. A further feature resides in the provision of at least one device or chuck incorporating a releasable jaw and a spring loaded jaw for gripping and rotating one or more members of various thicknesses to be wound by a filament. From another aspect the invention provides means for winding a filament onto a pair of members simultaneously the combined operations being completely automatic.

From yet another aspect the invention provides releasable means for gripping a pair of formers end to end, means for traversing a supply of wire axially of the two formers and means while so doing for rotating the formers in such manner that the wire is wound thereon in a spiral manner.

The invention further includes a winding machine for winding filaments onto two formers a core which comprises means for holding and rotating the formers about their own axis, means for positioning a bight in a length of filament at an intermediate location and for rotating said bight with the formers, and filament-guiding means for guiding the two legs of the filament at either side of the bight so that they are wound helically onto the formers one at each side of said intermediate location. Thus the two formers have helixes of opposite "hand" wound on them.

The foregoing and other features of the invention are incorporated in the machine which will now be described in greater detail with reference to the accompanying drawings.

Figure 1 is a general front perspective view of a machine according to this invention.

Figure 2 is a front view of part of the machine partly in section.

Figures 3, 4, 5, and 6 are detail views of clamping mechanism for formers to be wound.

Figures 7, 8, 9 and 10 are details of wire controlling mechanism.

Figure 11 is a detail of a travelling steady device for the formers.

Figure 12:
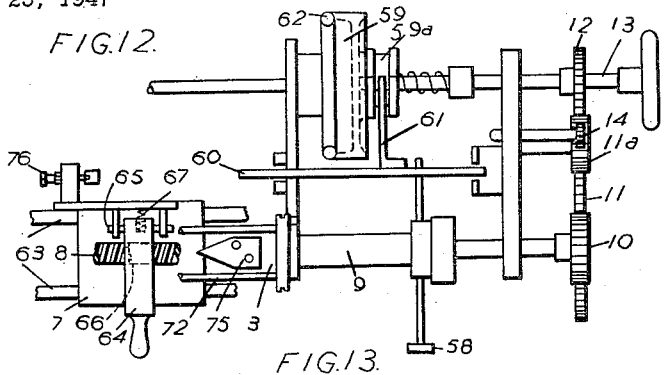

Figure 12 is a general plan view of part of Fig. 1.

Figure 13:
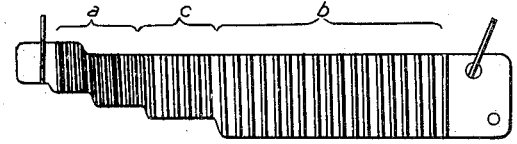

Figure 13 is a detail view of a wound former.

Figure 14:
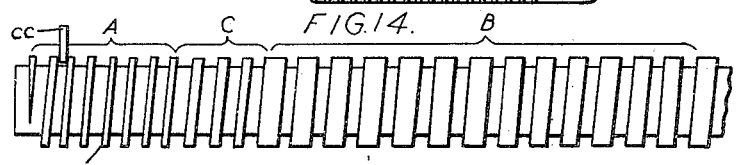

Figure 14 is a detail of a lead screw.

Figure 15:
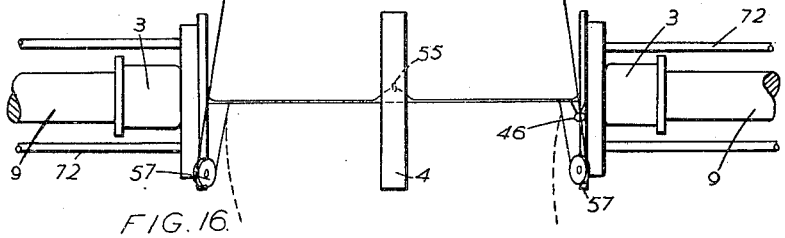

Figure 15 is a further detail of wire controlling means.

Figure 16:
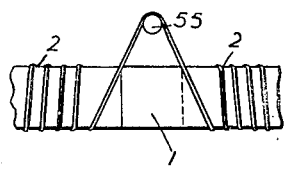
Figure 17:
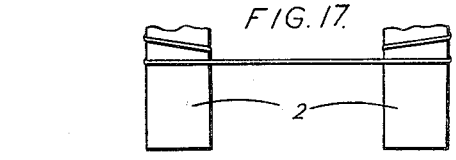
Figure 18:
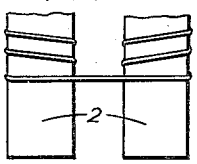

Figures 16, 17 and 18 are details of the adjacent ends of two formers.

Figure 19 is a plan view of a heating element.

Referring now to the drawings the machine shown in Figure 1 is constructed and arranged to wind flat sectioned resistance wire onto a pair of formers simultaneously to produce the electric heating element 1 illustrated in Fig. 19. This element includes two identical formers 2 of mica and they are positioned in the machine end to end as shown in Fig. 1 which shows the machine almost at the end of a wrapping operation. The general arrangement (hereinafter more fully described) is that the formers are gripped by two end chucks 3 and a centre chuck 4 by which they are rotated. The wire is drawn off from a supply bobbin 5 and is fed in a long loop to the centre of the machine, one length of the loop being for one former and the other length for the other former. Each length is guided by guides 6 and carried by a saddle member 7 reciprocable by lead screws 8 in such manner that the wire is traversed from the centre of the machine to the outer ends of the formers during which time the formers are rotated. The result is that the wire is spirally wound on the formers in the desired manner.

The machine will now be described in greater detail at the same time describing a complete sequence of operations.

The chucks 3 are each fixed to the end of a stub spindle 9 which is rotatable by gears 10 (one at each end of the machine) through intermediate gears 11, 11a, from a gear 12 on the main driving shaft 13. The intermediate gears 11a, also drive three gears 14 on shaft 14' the centre one of which rotates a gear wheel 15 fixed to the centre chuck 4. The latter is mounted to rotate on three rollers 16 carried by a supporting bracket 17 the rollers having a peripheral rim accommodated in a peripheral groove in the chuck to prevent lateral movement. Before the machine is started up the relevant parts are positioned as shown in Fig. 2, wherein the thread guiding devices 6 are spaced their widest distance apart. The first operation is to clamp the formers 2 in the chucks 3, and Fig. 3 shows the clamping jaws of clamps 3 (which are identical) in the open position. The end of the former 2 which has a hole 2a in it is placed on the lower jaw 18 which has an upstanding dowel 19 that enters the hole 2a. This jaw 18 is pivoted at 20 and is biassed upwardly by adjustable spring 21, the extent of upward movement being limited by pegs 22 riding in slots 23. The upper jaw 24 is suspended by pegs 25 riding in slots 26 and it is linked by link 28 to a locking lever 27 pivoted at 29. To clamp the former in position the lever 27 is swung over (anticlockwise in Fig. 3) and the upper jaw is carried forwards and downwards to a position where it overlies the end of the former 2 and presses downwards against the action of spring 21 into the position shown in Fig. 6. A flat face 27a of the lever 27 also engages behind a flat face 24a of the jaw 24 to lock the jaw in its clamped position. There is a slot 24b on the jaw 24 for accommodating the dowel 19. The other end of the former is laid on, now the lower jaw 30 of the centre chuck 4 (Figs. 2 and 4) which is pivoted at 31 and is also biased upwardly by a spring 32 there being a tail piece 33 engaging a stop 34 to limit the upward movement.

The pierced end of the second former is now clamped in the other end chuck 3 (in the same manner as the first former is clamped in the other chuck) and its other end is also placed on the lower jaw 30 of the centre chuck 4 overlapping the end of the first former for a short distance. The upper jaw 35 in the centre chuck 4 is pivoted at 36 and is manually moved into the clamping position shown in Figs. 5 and 7 by moving a knob 37 along the slot 38; a locking lever 39 is pivoted at 40, is moved by a sliding knob 41 along the slot 42 into the locking position whereat a tail piece 43 of lever 39 engages behind tail piece 44 of the jaw 35. A leaf spring 45 is provided having a hooked end 45a arranged to engage a hole 35a in the jaw 35 to hold the jaw steady temporarily in its open position.

The formers 2 having thus been clamped in position, the next operation is to position the wire ready for winding. Referring to Fig. 7 it will be seen that the wire extends from the supply bobbin 5 (which is suitably tensioned by a spring arm 5a) upwards to a position where it is temporarily clamped in a spring clip 46 such as the well known bulldog clip. The clip is suspended by a cord or wire 47 which extends over pulleys 48 down to a weight 49, to which it is attached by a spring 50. This weight is mounted to slide vertically on guide rods 51 and in its lowest position rests on a stop 52. To prevent the wire from twisting, the clip 46 has a looped member 53 attached to it through which extends a fixed guide cord or wire 54.

First the wire is drawn by hand into a loop as shown in broken lines at 56 taking care to draw the additional amount of wire from the bobbin leaving the clip 45 unmoved. The loop thus formed is threaded through a throat or slot 4a which leads inwards from the periphery to the centre of the chuck 4 (see Fig. 8) and is looped around an upstanding pin or peg 55 fixed to the lower jaw 30 as shown in Fig. 10. While being held in this position the wire guides 6 are traversed (by hand in a manner to be described later) to the centre of the machine. Each guide as shown in Fig. 9 consists of a cranked strip 56 having a guide groove at 56a and carrying a guide pulley 57 and the wire extending at each side of the chuck 4 is first laid along the grooves 56a, then underneath and around the pulleys 57, care being taken that the initial loop of wire is correctly positioned with the flat faces vertically behind the post and horizontal where as shown in Figure 10 the wires cross the formers.

The machine is now started up. To do this a plunger 58 (Figs. 1 and 12) is withdrawn from a hole in a slidable bar 60 to which a friction clutch actuating fork 61 is attached. The friction clutch is shown at 59, the axially movable part 59a being keyed to the main shaft 13 and the relatively stationary part being driven by belt 62 from a suitable motor. The plunger being withdrawn and the clutch engaged, the various gears 10, 11a, 12 and 14 are rotated to rotate the chucks 3 and 4 by the spindles 9 and to traverse the wire guides 6 from the centre of the machine to the outer ends of the formers with the result that the wire is wound in a spiral manner on the formers. The guides 6 are traversed by the lead screws 8 in the following manner. The saddle member 7 to which the guides 6 are fixed are mounted to slide on a pair of horizontal guide bars 63 and also being carried by each saddle there is an arm 64 pivoted at 65 to a bracket fixed to the saddle. This arm 64 carries a pin or finger 66 (Fig. 2) which engages in the teeth of the lead screw and it is normally pressed in engagement therewith by coil spring 67 (Fig. 12) with the result that as the lead screw rotates the finger 66, arm 64, saddle and guide 6 are all traversed together.

In order to support the formers 2 as near as possible to the position whereat the wire is being wound, for each former there is provided a travelling steady device comprising a pair of rollers 68 (one on each side of the formers). Figs. 6 and 11 which are fixed to slides 69 slidably mounted in a disc 70 and spring pressed together by springs 71. This disc is arranged to rotate with the formers and traverse with the guides 6 by being carried by a cage-like member 72 freely mounted on a spindle 9 and being connected by a fork member 73 to the saddle 7. These rollers 68 are therefore positioned immediately behind the guides 6 and they traverse with the guides always in the same relative position. At the outer end of each traverse a pair of nose portions 74 also fixed to the slides 69 at each end of the rollers engage a pair of wedge-shaped cams 75 (one on each side of the associated end chuck 3) which opens them and forces the rollers apart as shown in Fig. 2. In this position the rollers are beyond the ends of the former leaving the way clear for a wound former to be removed or a new one to be fixed. When new formers have just been fixed and the wire is ready to be positioned on the guides 6 said guides are traversed to the centre as before described. This action, which is accomplished by lifting the finger arm 64 to disengage the finger 66 from the lead screw 8 and carrying the saddle along by hand to the centre of the machine, also carries the rollers 68 (which disengage from the cams 75 and ride on to the former) to the centre of the machine.

When the required amount of winding has been completed the clutch 59 is automatically disengaged to stop the machine by the engagement of adjustable screw stop 76 (Fig. 12) fixed to the right hand saddle 7 with the end of the slidable bar 60. Immediately the stop has pushed the bar to disengage the clutch the plunger 58 is pushed in to engage the hole in the slide and lock it in the stopped position. The wire is now cut at the ends of the wound formers as shown in Fig. 15. First a cut is made somewhere in the region of the guide pulley 57 at the left, that end extending from the former being released as shown in dotted lines and the other end from the supply bobbin being held in the hand. On the right it will be seen that the bulldog clip 46 has been drawn down close to the pulleys 57 (and the weight 49 has been raised to the top, not shown) by the wire extending from the former to the clip being used up. The short end of the wire held by the clip is now released leaving it free as shown in dotted lines and the clip is now clipped onto the cut end of the wire at the other side which extends from the supply. The clip is now released and it is raised into the starting position shown in Fig. 7 by the action of the weight 49; thus a new length of wire is automatically drawn off in a measured length. To remove the wound formers the chuck clamps are opened and the two formers are twisted in order to withdraw them lengthwise, one of them having to pass through the gap 3a, in the chuck 3. At the time of removal the formers are located end to end with the wire extending in a loop between them as shown in Fig. 16. To complete the element the formers are turned through 90° to the position shown in Fig. 17 then twisted to make another wrap on each former bringing them closer together as shown in Fig. 18.

It is highly desirable that the pitch of the wire on the former becomes progressively closer towards the narrow end thereof and this is readily accomplished in a machine above described by varying the rate of traverse of the wire. In order to do this the lead screw 8 is formed with a helix or thread of varying pitch. The position at which the pitch changes preferably corresponds substantially to the position on the former whereat the width changes. This is clearly shown in the example illustrated in Figs. 13 and 14, wherein the narrow end of the former at $a$ is wound in a very small pitch by the corresponding small pitch portion A of the lead screw. The widest end of the former at $b$ is wound in a much larger pitch by the large pitch portion B of the lead screw, while in-between the narrow and the wide part of the former at $c$ the pitch of the wire is intermediate wound by the portion C of the lead screw also of intermediate pitch.

If desired the wire may be automatically cut, measured and re-fed between each successive winding operation.

We claim:

1. A winding machine for winding a single piece of resistance wire helically onto two flat formers simultaneously in such manner that the helices on the two formers are of opposite spirality, comprising two rotatable end chucks spaced apart in the axial direction and having jaws for gripping the outer ends of the two formers, a rotatable centre chuck positioned between said end chucks and having jaws for gripping the inner ends of the two formers whereby the formers are located end to end and each extends between the centre chuck and an end chuck, two traversing wire guides for feeding the ends of said piece of wire to the respective formers, means for traversing said guides simultaneously along their respective formers but in opposite directions, and a rotatable steady-device, traversing with each guide, for giving local support to the associated former each of which devices comprises a pair of rollers for gripping the former between them and for rolling along it as the device traverses.

2. A winding machine for winding a single length of electric resistance wire onto two flat formers located end to end, comprising two rotatable axially-spaced end chucks and a rotatable centre chuck disposed between them, which end chucks have jaws for gripping the outer ends of the formers and which centre chuck has jaws for gripping the inner ends of the two formers and has a throat leading inwards to its centre for the passage of the wire, means for rotating said chucks, wire guiding means for feeding the wire to the rotating formers, and means for traversing said guiding means along the formers.

3. A machine for winding a filament onto two formers simultaneously comprising releasable means for maintaining the formers end to end and rotating them about a common axis, guides for guiding the ends of a single length of filament one to each former, and means for simultaneously traversing each of said guides in an opposite direction lengthwise of the formers.

4. A winding machine according to claim 3 having means for anchoring a bight in the filament to the said releasable means.

5. A machine according to claim 3 having means for anchoring a bight in the filament to the said releasable means, which releasable means comprises a rotatable center check, a support for said chuck located near the periphery of the chuck and means for positively rotating said chuck about its axis.

6. A machine according to claim 3 having means for anchoring a bight in the filament to the said releasable means, which latter means comprises a center chuck having a throat in it for leading the bight inwards from the periphery of said chuck to said anchoring means.

7. A machine according to claim 3, in which said releasable means comprises a chuck, means for anchoring a bight in the filament to said chuck, and chucks supporting the ends of the formers remote from the center chuck and means mounting said end chucks for rotation in unison with the center chuck and formers.

8. A machine according to claim 3 having means for anchoring a bight in the filament to said releasable means, and wherein said latter means comprises a rotatable center chuck, supports for said chuck located near the periphery thereof, and chucks for gripping the ends of the formers remote from the center chuck, a support for each former, which supports are located between the chucks, and means for traversing said supports in unison with said guides.

9. A machine according to claim 3 having means for anchoring a bight in the filament to said releasable means, which latter means comprises a rotatable center chuck, supports for said chuck located near the periphery thereof, and end chucks for gripping the ends of the formers remote from the center chuck, in combination with means for supporting the formers between the center chuck and the end chucks, and means for varying the pitch of the windings as winding proceeds.

10. A machine according to claim 3 having in combination for anchoring a bight in the filament to said releasable means, which latter means comprises a rotatable center chuck, supports for said chuck located near the periphery thereof, and end chucks for gripping the ends of the formers remote from the center chuck; and means for supporting the formers between the center chuck and the end chucks, and means for varying the pitch of the windings as winding proceeds, which pitch-varying means comprises a variable pitch lead screw for traversing the filament guides.

11. A machine according to claim 3 having means for anchoring a bight in the filament to said releasable means, which latter means comprises a rotatable center chuck, supports for said chuck located near the periphery thereof and end chucks for gripping the ends of the formers remote from the center chuck, and also having means for varying the pitch of the windings as winding proceeds and means for automatically drawing off a predetermined length of filament from a supply between each wrapping.

ELSIE MAY BEHM.
ALEXANDER JAQUES EMIL BEHM.

REFERENCES CITED

The following references are of record in the file of this patent:

UNITED STATES PATENTS

| Number | Name | Date |
|---|---|---|
| 626,878 | Tymeson et al. | June 13, 1899 |
| 1,484,452 | Shoenberg | Feb. 19, 1924 |
| 1,522,861 | Bowles | Jan. 13, 1925 |
| 1,660,784 | Blanksten | Feb. 28, 1928 |
| 2,207,615 | Crandall | July 9, 1940 |
| 2,404,185 | Mann | July 16, 1946 |